April 20, 1965     F. I. WHITTEN ETAL     3,179,368
SHOCK ISOLATION SUPPORT

Filed Oct. 28, 1963     3 Sheets-Sheet 1

INVENTORS
FRANK I. WHITTEN
BY ARTHUR E. HIRSCH
ATTY.

INVENTORS
FRANK I. WHITTEN
ARTHUR E. HIRSCH
BY
*Hodges*
ATTY.

United States Patent Office 3,179,368
Patented Apr. 20, 1965

3,179,368
SHOCK ISOLATION SUPPORT
Frank I. Whitten and Arthur E. Hirsch, Montgomery County, Md., assignors to the United States of America as represented by the Secretary of the Navy
Filed Oct. 28, 1963, Ser. No. 319,614
18 Claims. (Cl. 248—401)
(Granted under Title 35, U.S. Code (1952), sec. 266)

The invention described herein may be manufactured and used by or for the Government of the United States of America for governmental purposes without the payment of any royalties thereon or therefor.

The present invention relates to shock isolating supports and more specificially to shock isolating supports which will protect seated personnel and equipment from violent shock forces such as those received by a ship when it is mined or torpedoed. Although the description below describes the invention as applied aboard a ship, it should be understood that it is within the contemplation of the invention that the same could be effectively applied anywhere it is desired to protect against shock forces.

When a ship is mined, it receives a violent first shock, followed by a rapid succession of shock pulses. In an effort to protect seated personnel and equipment from these shock motions, supports have been designed which utilize a hydraulic fluid medium and/or springs to absorb these shock motions. However, these supports are not practical and have not been employed because often the shock absorbing means will transmit part or all of the shock forces to the seated personnel or equipment; and under certain conditions, i.e., when the spring used and the equipment supported are in resonance, the spring will actually amplify the shock forces. Moreover, since the fluid and/or springs are the only supporting means for the supported object, the object will oscillate up and down when a rocking motion is imparted to the ship as it moves through rough waters, due to its weight acting on the fluid and spring. Thus, when it is desired to provide a rigid, positive, steady seat for the supported object, these shock protection supports may not be employed; and when it is desired to provide a shock protection support, no positive, rigid support can be used. One of these desirable features must be sacrificed for the other.

The present invention overcomes the above-mentioned disadvantages, and provides a shock isolation support which may be employed wherever shock isolation is desirable. To accomplish this, the invention provides a unique arrangement of telescoping cylinders, an energy transferring medium disposed between the cylinders, and one or more self-rearming shearing pin mechanisms to provide a rigid, positive connection between the deck and the seated object.

Accordingly, it is an object of this invention to provide a support for isolating seated personnel and equipment from shock motions.

It is another object of this invention to provide a support for isolating seated personnel and equipment from shock forces while providing a rigid, positive, steady, stable support for the same.

It is another object of this invention to provide a shock isolating support which will isolate seated personnel and equipment from a first shock force, and then quickly rearm itself to isolate them from subsequent shock pulses.

It is another object of this invention to provide a shock isolating support which will protect seated personnel and equipment from vertical or transverse shock forces.

Other objects and advantages of the invention will herein after become more fully apparent from the following description of the annexed drawings, which illustrate a preferred embodiment, and wherein.

Figure 1:
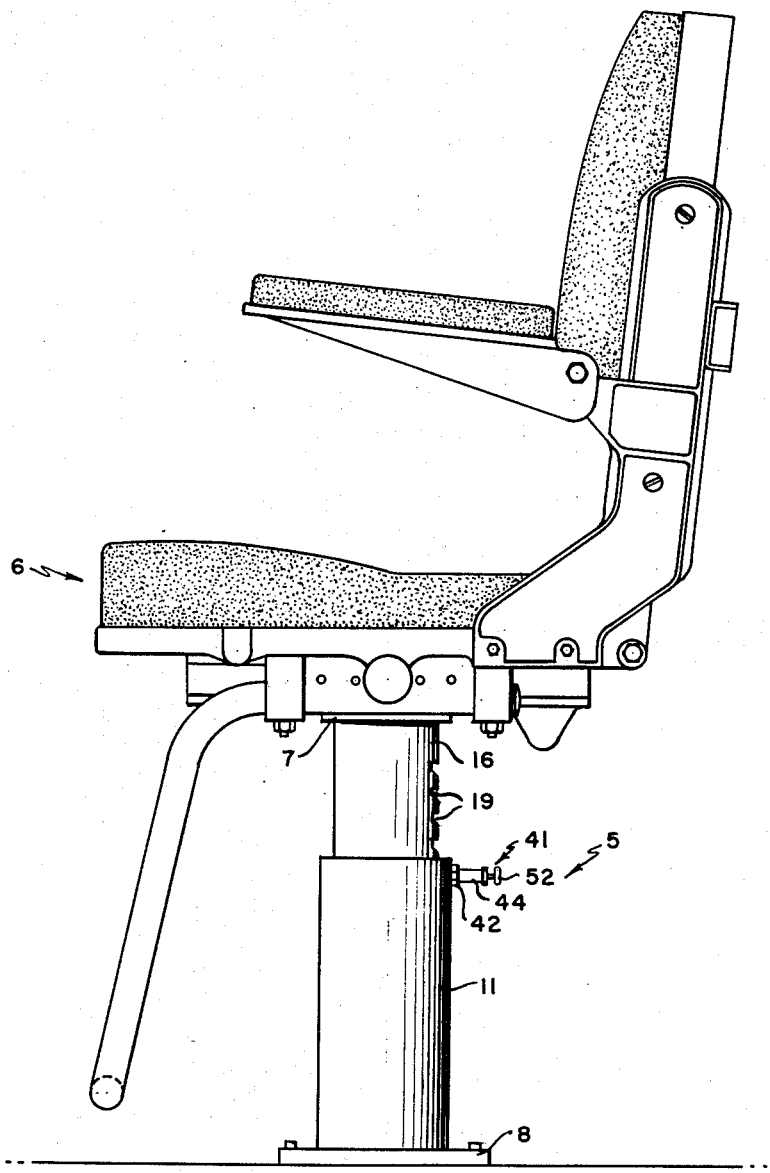
FIG. 1 is a side view of one embodiment of the invention including a novel support and a chair seated thereon.

Referring now to the drawings, wherein like reference characters designate like or corresponding parts throughout the several views, there is shown in FIG. 1 a chair 6 mounted on shock isolating support 5.

Figure 2:
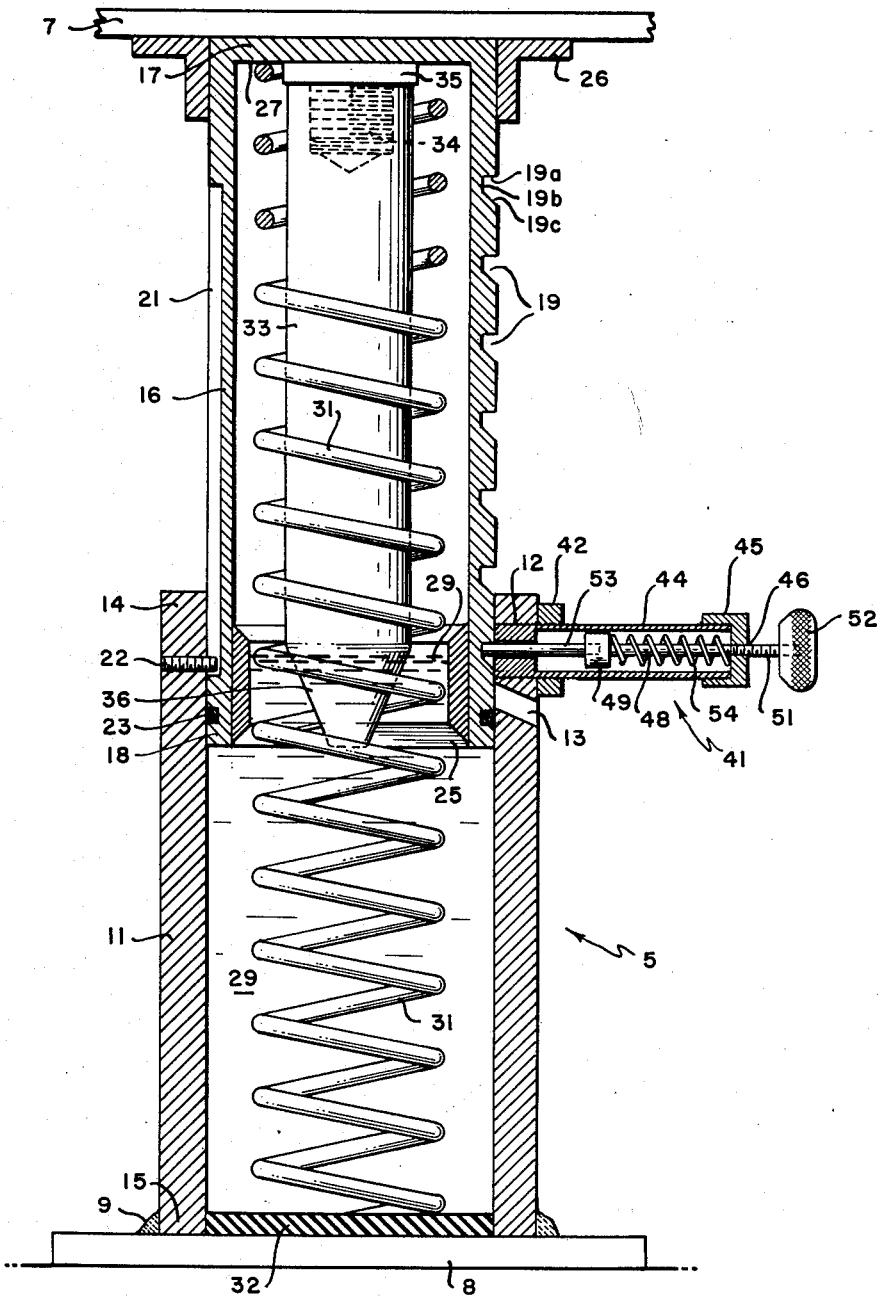
FIG. 2 is a cross-sectional view of the support of FIG. 1.

As can be seen in FIG. 2, support 5 includes a hollow, upwardly opening base member 11 shown as a lower female cylinder. Base member or lower cylinder 11 has a bottom end 15 welded or otherwise secured, as at 9, to a platform 8. The platform 8 may then be secured to a floor or deck of a ship. If desired, bottom end 15 of base 11 could be secured directly to the floor or deck, thus obviating the need for platform 8.

Telescopically received within the top end 14 of base member or lower female cylinder 11 is a support member 16, shown as an upper male cylinder. Support member or upper male cylinder 16 has an open bottom end 18 and a closed top end 17; said top end 17 being adapted to support a seating member 7 via bracket 26. The seating member, in turn, may support a chair 6, as shown in FIG. 1, or any piece of equipment or object to be protected from shock motions.

Within hollow cylinders 11 and 16 is located energy transferring means for preventing collision between the upper and lower cylinders, or between the upper cylinder and the platform 8, after the upper cylinder has been isolated from the movement of the lower cylinder. This energy transferring means includes fluid 29, a metering plunger 33, and an orifice plate or nozzle 25. Fluid 29 should preferably fill lower cylinder 11 up into the lower end 18 of upper cylinder 16. Metering plunger 33 has its upper end 35 secured to the bottom 27 of the closed top 17 of upper cylinder 16 by hold bolt 34, and extends longitudinally within the same. The lower or terminal end of metering plunger 33 may be tapered, as at 36, and extends to the lower end 18 of support 16. Orifice plate or nozzle 25 may be secured within, or may be integral with the open bottom end 18 of hollow support member 16, and cooperates with plunger 33 and fluid 29 to prevent collision between the upper and lower cylinders, or between the upper cylinder and the platform 8, as will be explained hereinafter. A spring 31 is disposed between the top of upper cylinder 16 and the bottom of base member 11 for urging cylinders 11 and 16 to their equilibrium or starting position (the position shown in FIG. 2). A cushioning pad 32, of a material which is insoluble in fluid 29, may be placed between the bottom of spring 31 and the platform, floor, or deck on which lower cylinder 16 is mounted. An O-ring seal 23 is disposed in a circular groove in the lower portion of upper cylinder 16 to protect against leakage of fluid 29 between the outer wall of upper cylinder 16 and the inner wall of lower cylinder 11.

A guide pin 22 is mounted in the upper end 14 of base member 11, and extends inwardly into a longitudinal guiding groove 21 in the outer surface of support member 16. The pin 22 and groove 21 cooperate to guide and limit the movement of support member 16 with respect to base member 11.

Also in the outer surface of support member 16 is a vertical row of positioning grooves 19, used for a purpose described hereinafter. Each groove 19 has a horizontal upper wall 19a, a vertical end wall 19b, and a downwardly slanting lower wall 19c.

Mounted within an aperture 12 in the upper portion of base member or lower cylinder 11 is a novel self-rearming shear pin mechanism 41 including a casing or tube 44, a closure 45, a rod 48, a spring 54, a handle 52, and a replaceable shear pin 53. One end of casing 44 may be secured in aperture 12 and mounting 42 by screw threads, welding, or any other conventional securing means. The other end of casing 44 is covered with cup-shaped closure 45, which has a hole 46 therethrough. Rod 48 is enlarged at its shear pin carrying end 49, and has its other end 51 extending through hole 46 in closure 45. A replaceable shear pin 53 is carried in a notch in the enlarged end 49 of rod 48, and a handle 52 is secured on the opposite end 51 of rod 48. Spring 54 is interposed between enlarged end 49 and closure 45 for urging shear pin 53 towards upper cylinder or support member 16. If casing 44 is permanently secured to base member 11, closure 45 should be secured to casing 44 via screw threads, and vice-versa, to facilitate replacement of shear pin 53.

A slot 13 is provided in base member 11 directly below aperture 12 and provides an exit for the portion of shear pin 53 which is sheared off when base member 11 moves upwardly with respect to support member 16. As can be seen in FIG. 2, shear pin 53 fits in a groove 19 in upper cylinder or support member 16 to provide a positive, rigid seat for the support member 16.

In describing the operation of support 5, it is assumed that, at the start, the upper and lower cylinders are in the position shown in FIG. 2, which is the equilibrium position. Assuming the support in FIG. 2 is mounted aboard a ship, when the ship is mined, the first shock force will hit the deck and urge base member 11 upwardly, but such movement will be resisted by shear pin 53 seated in groove 19. If the shock force is greater than some predetermined magnitude, it will force relative movement between upper cylinder 16 and lower cylinder 11 which will shear the end of shear pin 53 allowing lower cylinder 11 to ride up on upper cylinder 16, thus isolating the upper cylinder from the initial shock force.

If the shock force is great enough, it will impart so great an acceleration to lower cylinder 11 that it would cause it to collide with upper cylinder 16, imparting a shock to the seated person or object. The energy transferring means prevents such a collision. As lower cylinder 11 is accelerated upwardly, fluid 29 is forced into the upper cylinder; however, the metering plunger 33 and nozzle 25 will resist the flow of the fluid, thus transferring some of the energy of the lower cylinder to the upper cylinder, causing the upper cylinder to travel upwardly a short distance. As the fluid 29 is forced around plunger 33 into the upper cylinder, it will compress the air therein; the air being at atmospheric pressure prior thereto.

During the time that lower cylinder 11 is moving relative to upper cylinder 16, spring 54 is urging shear pin 53 toward upper cylinder 16; but since the shock wave has imparted a very rapid acceleration to lower cylinder 11, the shear pin 53 will by-pass the first few positioning grooves 19. Although spring 54 of shear pin mechanism 41 is a relatively weak spring, it may force shear pin 53 into one of the middle positioning grooves 19 as lower cylinder 11 moves upwardly. If this happens, the relative movement between the cylinders will again shear off the end of pin 53.

When lower cylinder 11 stops moving upwardly shear pin 53 will seat itself in the nearest positioning groove, and the compressed air in upper cylinder 16 and the compressed spring 31 will urge upper and lower cylinders 11 and 16 away from one another towards their equilibrium position. Since the lower wall 19c of each groove 19 is slanted, it provides a camming surface. The force exerted against cylinders 11 and 16 by the compressed air, and spring 31 will be sufficient to cam shear pin 53 out of the groove in which it is seated, allowing the upper and lower cylinders to be forced away from one another.

After lower cylinder 11 reaches its starting position, upper cylinder 16 will settle downwardly and shear pin 53 will lodge into one of the lower grooves 19. The support is now rearmed and ready to protect against subsequent shock pulses. The above cycle takes place within a fraction of a second.

It should be noted that neither spring 31, fluid 29, the nozzling structure, 25 and 36 nor the air in cylinder 16, taken singly or in combination could support upper cylinder 16 in the position of FIG. 2. They serve only to prevent collision between the cylinders, and to urge them into their equilibrium or starting position. Consequently, the shock isolation support will be effective without the energy transferring means, and the same may be eliminated from the support in certain circumstances.

As can be seen, shear pin mechanism 41 may also be used to manually raise or lower seating member 7 to a desired height.

Figure 3:
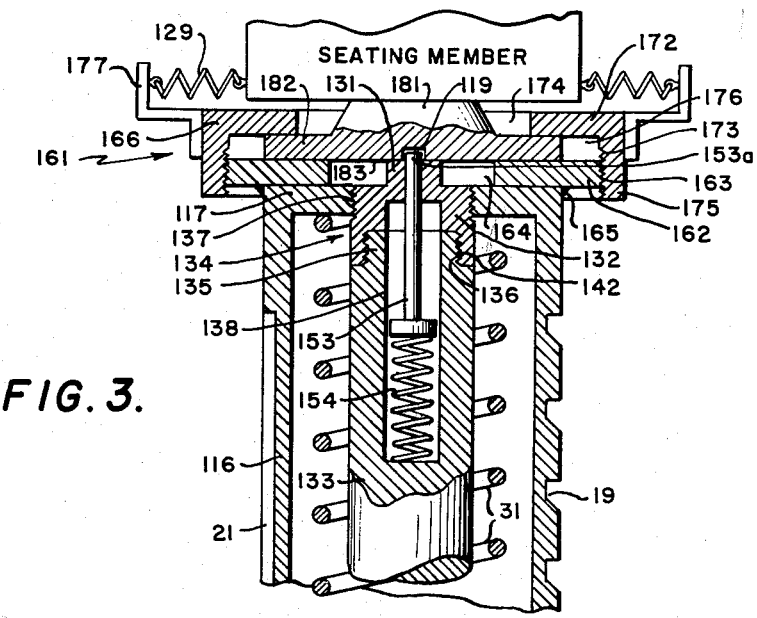
FIG. 3 is a cross-sectional view, partly broken away, of the invention wherein the support is provided with a shear pin mechanism to protect the seated object from transverse shock forces.
Figure 4:
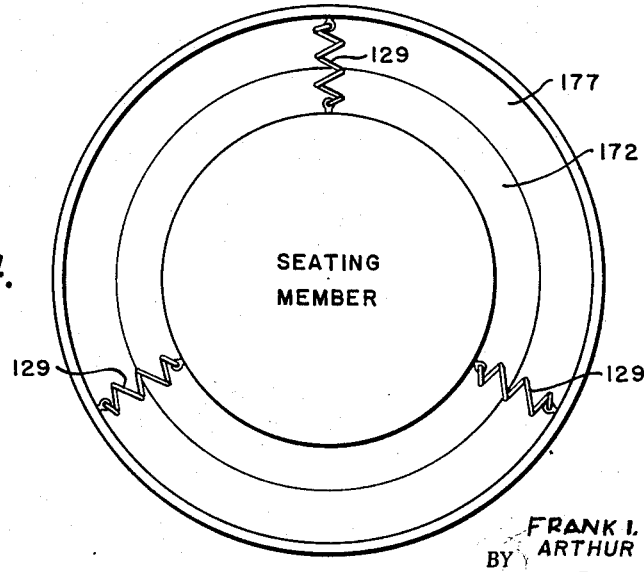
FIG. 4 is a top view of the support of FIG. 3.

FIGS. 3 and 4 show the upper portion of support 5 modified to protect against transverse shock waves.

In FIG. 3 is shown a support member 116 which differs from support member 16 only in that support 116 is provided with a threaded hole 137 in its top end 117. Plunger 133 differs from plunger 33 only in that the upper end of plunger 133 is adapted to carry a second shearing pin mechanism. Specifically, the upper end 135 of plunger 133 terminates short of top end 117 and is secured thereto via a special adapter 134. Adapter 134 is cup shaped and threaded intermediate its ends so as to fit within threaded hole 137. The upper end 131 of adapter 134 extends upwardly and out of hollow support member 116, and the lower end 132 extends downwardly into hollow support member 116. The lower end 132 has internal threads 142 which cooperate with threads 136 at the top end 135 of plunger 133 to secure said plunger to said support.

The upper portion of plunger 133 acts as a shear pin holder, and is provided with an upwardly opening chamber 138 which contains a replaceable shear pin 153, and a spring 154 between the bottom of the chamber and said shear pin for urging said shear pin out of said chamber. A casing 161 is mounted on top of support 116. Casing 161 includes a lower plate 162 threaded as at 163 along its outer circumference, having a central opening 164, and welded as at 165 to support 116. Casing 161 also includes an inverted cup shaped member 166 having an upper plate 172 with a central opening 174 therein, and a peripheral wall 175 connecting upper plate 172 and lower plate 162. The peripheral wall 175 has internal threads 173 which cooperate with thread 163 on lower plate 162 to secure the plate within cup shaped member 166, but spaced from upper plate 172. The upper plate 172, peripheral wall 175, and lower plate 162 form a slot 176. Attached to the peripheral wall 175 is a bracket 177.

A pedestal 181, adapted to carry a seating member, is mounted within casing 161. Pedestal 181 has a flange 182 at its bottom end, which flange slidably fits in slot 176. In the bottom surface 183 of flange 182 is a slot 119 adapted to receive the end of shear pin 153 projecting from chamber 138. The pedestal 181 projects upwardly through central opening 174 in upper plate 172. Upwardly extending end 131 of adapter 134 extends into central opening 164 in lower plate 162 and terminates in the plane of the upper surface 168 of plate 162, which plane is directly adjacent the plane of the bottom surface 183 of flange 182. End 153a of shear pin 153 seats in slot 119 to restrain the pedestal and its supported seating member from moving transversely. Rearming springs 129 are equally spaced from one another and yieldably connect the seating member to support 116 via bracket 177 and casing 161.

In describing the operation of the embodiment of FIGS. 3 and 4, it is assumed that the support is in its equilibrium position; that is, the position illustrated in FIG. 3. Assuming the transverse shock wave approaches from the right hand side of FIG. 3, the shock wave will hit support 116, via its base, and tend to urge it and adapter 134 to the left. If the shock wave is of sufficient magnitude, the relative movement between adapter 134 and flange 182, held stationary by inertia, will shear end 153a of shear pin 153, which end will be deposited in the space where opening 164 is located, and casing 161 on support 116 will move to the left. When the transverse motion of the support and casing has stopped, springs 129 will tend to return the support and casing to the equilibrium position, and spring urged shear pin 153 will reseat itself in slot 119, whereby the support is rearmed for succeeding transverse shock pulses.

The springs 129 are shown as three springs spaced 120° apart. However, more springs could be used, and should be equally spaced around the seating member.

Although FIGS. 3 and 4 show the shear pin mechanism for protecting against transverse shock pulses as being mounted on the upper end of a support which has another shear pin mechanism for protecting against vertical shock waves; it is contemplated that, in the event that only transverse shock waves are to be encountered, the support 116 could be mounted directly on a floor or deck. In this instance, of course, spring 31, groove 21, and groove 19 would be unnecessary.

Thus, there has been described a support for protecting a supported object from shock waves, while providing a positive, steady, stable seating.

Obviously many modifications and variations of the present invention are possible in the light of the above teachings. It is, therefore, to be understood that within the scope of the appended claims, the invention may be practiced otherwise than as specifically described.

What is claimed is:

1. A support for protecting an object from shock motions comprising,
   a hollow, upwardly opening base member;
   a support member having an outer surface telescopically received in said base member;
      said outer surface of said support member having at least one groove therein;
   and a shear pin extending from said base member and seated in said groove, said shear pin being retained by a spring loaded, self-rearming shear pin mechanism which is mounted on said base member, whereby, said shear pin will support said support member at a desired position and will shear when a force of a predetermined magnitude hits said base member and forces it to move relative to the support thereby isolating said support member from the shock motion.

2. A support for protecting an object from shock motions comprising:
   a hollow, upwardly opening base member;
   a hollow support member opening downwardly, having a closed top end and outer surface telescopically received in said base member;
   said outer surface of said support member having at least one groove therein;
   a shear pin extending from said base member and normally seated in said groove;
   a fluid in said base member;
   nozzle means including an orifice secured within said hollow support member adjacent its lower end for resisting movement of said fluid from said base member to said support member when a shock force of predetermined magnitude hits said base member and shears said shear pin;
   a metering plunger having an upper end secured to the bottom of said closed top end of said hollow support member, extending longitudinally in said hollow support member, and terminating within said orifice; and
   a spring disposed between said base member and said support member for urging said base and support members to a desired position whereby an object mounted on said support will be protected from shocks exceeding a predetermined magnitude.

3. A support according to claim 2, wherein the end of said metering plunger which terminates within said orifice plate is tapered.

4. A support for protecting supported objects from shock comprising,
   a lower female cylinder having an open top end, and adapted to carry a quantity of fluid therein;
   an upper male cylinder telescopically received in said lower female cylinder;
   energy transferring means disposed between said upper and lower cylinders;
   a shear pin mounted within an aperture in the said lower cylinder adjacent said open top end, said shear pin being carried by a self-rearming shearing pin mechanism mounted in said aperture, whereby the said shearing pin resists to a predetermined level relative movement between the said upper and lower cylinders, said pin being adapted to break when a force of a predetermined magnitude urges one of the cylinders to move relative to the other, allowing relative movement therebetween.

5. A support according to claim 4, wherein said shearing pin mechanism includes,
   a tubular casing having a first end secured within said aperture in said lower cylinder,
   and a second end extending out of said aperture;
   a closure on said second end of said casing, said closure having a hole therein;
   a rod having an enlarged end disposed in said casing, and a second end extending out of said hole in said closure;
   and a spring mounted in said casing between said enlarged end of said rod and said closure urging said rod toward said first end of said casing.

6. A support according to claim 5, wherein said shear pin is replaceable and is mounted in said enlarged end of said rod.

7. A shock isolating support comprising,
   a lower female cylinder having an open top end, and a bottom end which is adapted to be secured to a base member;
      said lower female cylinder having an aperture therein adjacent its top end;
      said lower female cylinder being adapted to contain a quantity of liquid therein;
   an upper male cylinder telescopically received in said lower cylinder, and having an open bottom end and a closed top end which is adapted to support a seating member;
      said upper male cylinder having a longitudinally extending guiding groove and a vertical row of positioning grooves in its outer surface;
   a guide pin mounted in said lower cylinder adjacent the top end thereof and extending into the longitudinal guiding groove in said upper male cylinder for guiding and limiting the movement of said upper cylinder with respect to said lower cylinder;
   a spring member mounted between said upper and lower cylinders urging the same toward a desired position;
   a nozzle secured within the open bottom end of said upper male cylinder;
   a metering plunger extending longitudinally in said upper cylinder;
      said metering plunger having a top end secured to the bottom of the closed top end of said upper cylinder, and a bottom end which terminates in said nozzle for metering the flow of a liquid through said nozzle;

and a spring loaded, self-rearming shear pin mechanism mounted in said aperture in said lower cylinder including, a tubular casing open at both ends; one end of said casing being received in said lower cylinder, and the second end extending outwardly therefrom;

a plate having a hole therein covering the second end of said casing;

a shear pin holder in said casing including, a rod having an outer end extending out of the hole in said plate, and an enlarged inner end disposed within said casing;

a handle on the said outer end of said rod;

and a spring member disposed in said casing between said enlarged end of said rod and the plate covering the second end of said casing, urging the rod inwardly toward said upper cylinder;

and a replaceable shear pin having one end fitting in the enlarged end of said rod, and a second end adapted to seat in one of the positioning grooves in said upper cylinder.

8. A shock isolating support according to claim 7, wherein there is a slot in said lower cylinder directly below said aperture, providing an exit for the sheared end of said shear pin.

9. A shock isolating support according to claim 7, wherein there is a cushioning pad between the lower end of the spring member and the bottom end of said lower cylinder.

10. A shock isolating support according to claim 7, wherein each positioning groove has a horizontal upper wall, a vertical inner wall, and a slanted lower wall which may act as a camming surface.

11. A support for protecting an object from transverse shock waves including:

a hollow support member having a top end with an aperture therein;

a pedestal slidably mounted on said top end, said pedestal having an upper end adapted to support a seating member, and a bottom surface having a slot therein;

a shear pin mechanism mounted in said aperture and extending into said hollow support member; and a shear pin having an inner end disposed in said shear pin mechanism and an outer end extending out of said shear pin mechanism, said outer end seated in the said slot in the bottom surface of the said pedestal whereby the shear pin restrains relative transverse movement between said pedestal and support member and is adapted to shear enabling unrestrained relative transverse movement between the said pedestal and support member responsive to a force of a predetermined magnitude.

12. A support according to claim 11, wherein said shear pin mechanism includes, a shear pin holder having an upwardly opening chamber therein;

and a spring disposed in the bottom of said chamber for urging said shear pin out of said shear pin mechanism into said slot in the bottom surface of said pedestal.

13. A support for projecting an object from transverse shock waves, comprising, a hollow support member having a top end;

said top end having an aperture therein;

a casing secured to said top end of said support member, and including, an upper plate having an opening therein;

a lower plate spaced from said upper plate and having an opening therein;

and a wall connecting the peripheries of said upper and lower plates, said wall and upper and lower plates defining a slot therebetween;

a pedestal having a flange at its lower end;

said flange slidably fitting within said slot in said casing;

said flange having a bottom surface and a slot located centrally therein;

said pedestal having an upper end extending through the opening in the upper plate of said casing, and adapted to support a seating member thereon;

a spring loaded, self-rearming shear pin mechanism mounted in said hollow support member, and including, a shear pin holder having an upwardly opening chamber extending longitudinally therein;

said shear pin holder having an upper portion secured within the aperture in the top end of said support member;

said upper portion of said shear pin holder extending through said aperture, through the opening in the lower plate of said casing, and terminating in a plane directly adjacent the bottom surface of said flange;

a replaceable shear pin in said chamber having a first end adapted to seat in said slot in the bottom surface of said flange, and a second end disposed within said chamber;

a spring disposed within said chamber between the second end of said replaceable shear pin and the bottom of said chamber, said spring urging said shear pin into the slot in the lower surface of said flange;

and a plurality of seating member retaining springs, each spring having an outer end secured to a point on the periphery of said casing, and an inner end adapted to be secured to a seating member, for yieldably retaining the seating member on top of said pedestal.

14. A shock isolating support comprising, a lower female cylinder having an open top end, and a bottom end adapted to be secured to a platform;

an upper male cylinder having an open bottom end, and a top end having an aperture therein;

energy transferring means disposed between said upper and lower cylinders;

a pedestal slidably mounted on the top end of said upper male cylinder, and adapted to carry a seating member;

a shear pin mounted between said cylinders for preventing relative movement therebetween, and adapted to shear and allow relative movement therebetween when a force of a predetermined magnitude urges one of said cylinder to move relative to the other;

and a vertical shear pin mounted between said upper cylinder and said pedestal for preventing relative movement therebetween, and adapted to shear and allow relative movement therebetween when a force of a predetermined magnitude urges one to move relative to the other.

15. A shock isolating support according to claim 14, wherein said energy transferring means includes a metering plunger having an upper portion secured to the top end of said upper male cylinder;

said upper end of said metering plunger having an upwardly opening chamber therein;

said pedestal has a bottom surface having a slot therein;

said shear pin has an inner end disposed within said chamber, and an outer end extending out of said chamber and seated in said slot in the bottom surface of said pedestal;

and a spring is disposed between the bottom of said chamber and the inner end of said shear pin urging said shear pin into the slot in the bottom surface of said pedestal.

16. A shock isolating support according to claim 14, wherein
said lower cylinder has an aperture therethrough adjacent its upper end;
said upper cylinder has an outer surface having at least one groove therein;
a tubular casing a secured within said aperture in said lower cylinder;
said tubular casing having an open inner end secured within said aperture, and an outer end extending outwardly from said aperture;
said shear pin has an inner end disposed within said casing, and an outer end extending through the open inner end of said casing and seated in the slot in the outer surface of said upper cylinder;
and a spring is disposed in said casing between the outer end of said casing and the inner end of said shear pin urging said shear pin toward the groove in the upper cylinder outer surface.

17. A self-rearming shearing pin mechanism including,
a casing having an open first end and a second end;
a shear pin having an inner end disposed in said casing, and an outer end extending out of said open first end in said casing;
and a spring disposed between the second end of said casing and the inner end of said shear pin, urging said shear pin out of the open end of said casing.

18. A self-rearming shearing pin mechanism for use between two members comprising,
a hollow casing having an open first end adapted to be secured within an aperture in one of the members; and a second end adapted to extend outwardly therefrom;
a plate having a hole therein covering the second end of said casing;
a shear pin holder in said casing including,
a rod having an outer end extending out of the hole in said plate and an enlarged inner end disposed within said casing;
a handle on the said one end of said rod;
and a spring member disposed in said casing between the enlarged inner end of said rod and said plate, urging the rod toward the inner end of said casing;
and a replaceable shear pin having one end fitting in the enlarged end of said rod, and a second end adapted to seat in a groove in the other member.

References Cited by the Examiner

UNITED STATES PATENTS

| | | | |
|---|---|---|---|
| 2,041,154 | 5/36 | Slutz | 248—400 |
| 2,092,669 | 9/37 | Greve | 248—400 |
| 2,272,344 | 2/42 | Kimbro | 267—1 |
| 2,461,810 | 2/49 | Curtis | 248—354 |
| 2,526,552 | 10/50 | Gillespie | 248—400 |
| 2,637,368 | 5/53 | Cotton | 297—216 |
| 2,778,627 | 1/57 | Sands | 248—400 |
| 2,811,385 | 10/57 | Butlet | 293—86 |
| 2,968,458 | 1/61 | Moeller | 248—19 |
| 2,993,732 | 7/61 | Walker | 297—216 |
| 3,027,131 | 3/62 | Piccione | 248—429 |
| 3,112,955 | 12/63 | Stolz | 297—216 |

CLAUDE A. LE ROY, *Primary Examiner.*